United States Patent
Baechle et al.

(10) Patent No.: US 12,085,070 B2
(45) Date of Patent: Sep. 10, 2024

(54) COMPUTER-AIDED METHOD AND DEVICE FOR OPTIMIZED CONTROL OF THE DELIVERY RATE OF A CONCRETE PUMP OR THE LIKE

(71) Applicant: PERI SE, Weissenhorn (DE)

(72) Inventors: Helmut Baechle, Weissenhorn (DE); Henning Staves, Weissenhorn (DE); Vanessa Bernard, Weissenhorn (DE); Ruediger Baumann, Weissenhorn (DE)

(73) Assignee: PERI SE, Weissenhorn (DE)

( * ) Notice: Subject to any disclaimer, the term of this patent is extended or adjusted under 35 U.S.C. 154(b) by 214 days.

(21) Appl. No.: 17/601,324

(22) PCT Filed: Apr. 3, 2020

(86) PCT No.: PCT/EP2020/059488
§ 371 (c)(1),
(2) Date: Oct. 4, 2021

(87) PCT Pub. No.: WO2020/201472
PCT Pub. Date: Oct. 8, 2020

(65) Prior Publication Data
US 2022/0213888 A1    Jul. 7, 2022

(30) Foreign Application Priority Data
Apr. 3, 2019    (DE) .......................... 102019108781.3

(51) Int. Cl.
*F04B 49/06*    (2006.01)
*B28C 5/42*    (2006.01)
(Continued)

(52) U.S. Cl.
CPC .......... *F04B 49/065* (2013.01); *B28C 5/4258* (2013.01); *B28C 7/163* (2013.01);
(Continued)

(58) Field of Classification Search
None
See application file for complete search history.

(56) References Cited

U.S. PATENT DOCUMENTS

| 9,945,229 B2 | 4/2018 | Kern |
| 2012/0243916 A1 | 9/2012 | Oomori |
| 2017/0254202 A1 | 9/2017 | Kern |
| 2018/0126588 A1* | 5/2018 | Martinola ................. B28B 1/14 |

(Continued)

FOREIGN PATENT DOCUMENTS

| CN | 102312827 | 1/2012 |
| CN | 102409858 | 4/2012 |

(Continued)

OTHER PUBLICATIONS

DIN 18218:2010-01 Frischbetondruck auf lotrechte Schalungen, Jan. 2010 (DIN EN 18218 2010-01 Pressure of Fresh Concrete on Vertical Formwork).

(Continued)

*Primary Examiner* — Ryan A Jarrett
(74) *Attorney, Agent, or Firm* — SLEMAN & LUND LLP

(57) ABSTRACT

A method and a device for controlling the delivery rate of a concrete pump for filling a formwork arrangement with a pumpable filling compound as a function of curing-relevant material and environmental parameters, after which the installed filling compound sets within the formwork arrangement, comprising the following steps: determining a permissible climbing speed for filling the formwork arrangement with the filling compound on the basis of the material and ambient parameters, measuring the static filling compound pressure acting on the formwork arrangement during filling, and calculating the permissible delivery rate of the concrete pump as a function of the determined permissible rate of ascent and the measured static filling compound pressure at the formwork arrangement.

16 Claims, 3 Drawing Sheets

Figure 1:
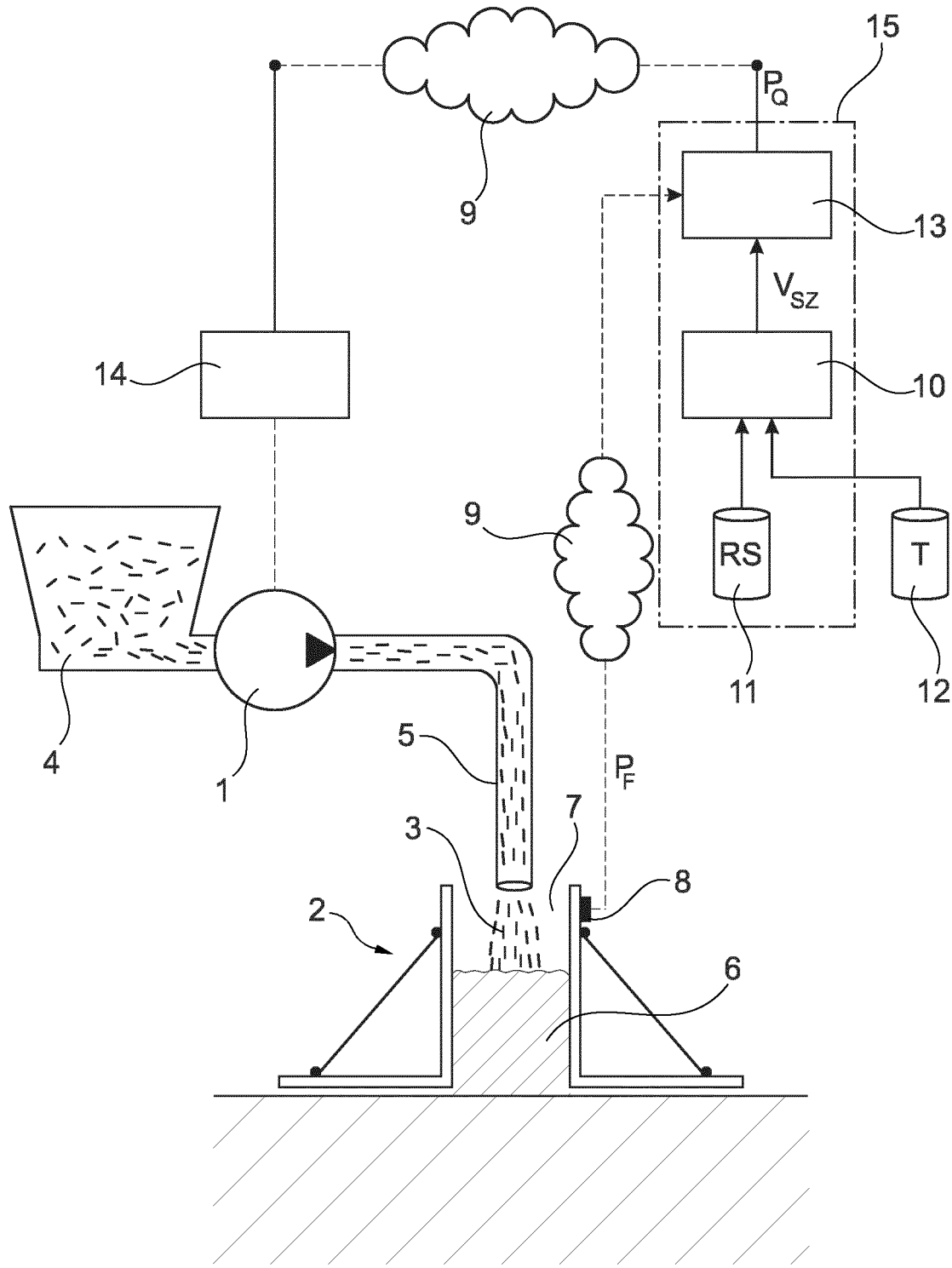

(51) Int. Cl.
B28C 7/16 (2006.01)
E04G 21/04 (2006.01)
F04B 15/02 (2006.01)
G05B 15/02 (2006.01)

(52) U.S. Cl.
CPC ......... *E04G 21/0418* (2013.01); *G05B 15/02* (2013.01); *F04B 15/023* (2013.01); *F04B 2207/02* (2013.01); *F04B 2207/03* (2013.01)

(56) References Cited

U.S. PATENT DOCUMENTS

2018/0238820 A1* 8/2018 Ghods ................. G01N 27/026
2019/0003473 A1 1/2019 Tanju

FOREIGN PATENT DOCUMENTS

| CN | 105626495 | | 6/2016 |
|---|---|---|---|
| CN | 108333334 | | 7/2018 |
| DE | 102008017123 | A1 | 11/2009 |
| DE | 102010036758 | | 2/2012 |
| DE | 102011050018 | | 10/2012 |
| EP | 0449153 | | 10/1991 |
| EP | 2107184 | | 10/2009 |
| EP | 2323823 | B1 | 9/2013 |
| EP | 3168413 | | 5/2017 |
| EP | 3216979 | A1 | 9/2017 |
| JP | S61221457 | A | 10/1986 |
| JP | 2013209801 | A | 10/2013 |
| JP | 2014167215 | | 9/2014 |
| JP | 2018119372 | A | 8/2018 |

OTHER PUBLICATIONS

Huang Jianzhong;, "Discussion on Pumping Concrete Construction Technology".
Jiang, Linting;, "Calculation of Impact Loads on Horizontal Formwork by Pumped Concrete".

* cited by examiner

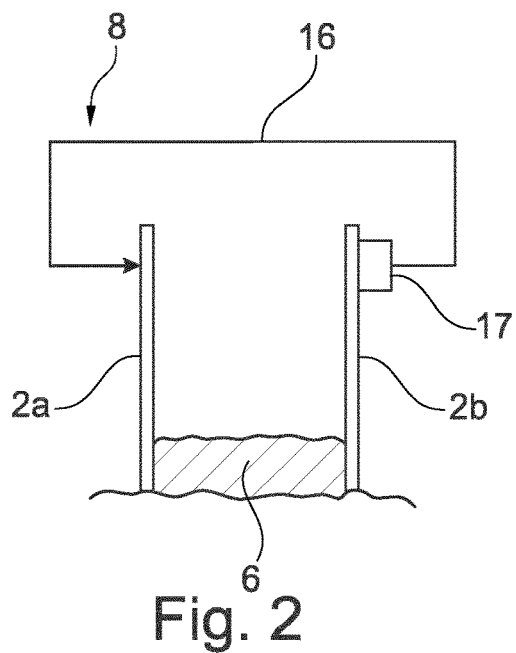
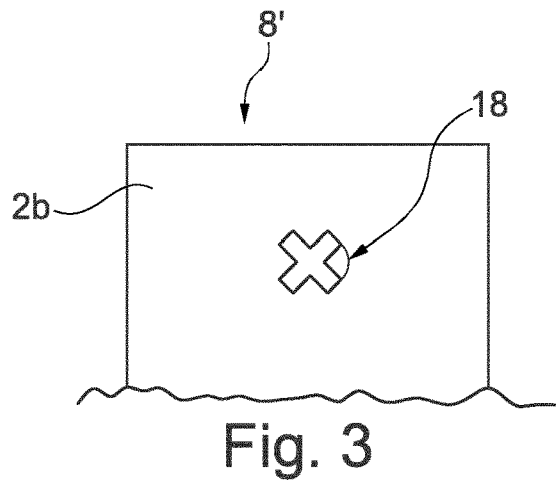
Fig. 2
Fig. 3
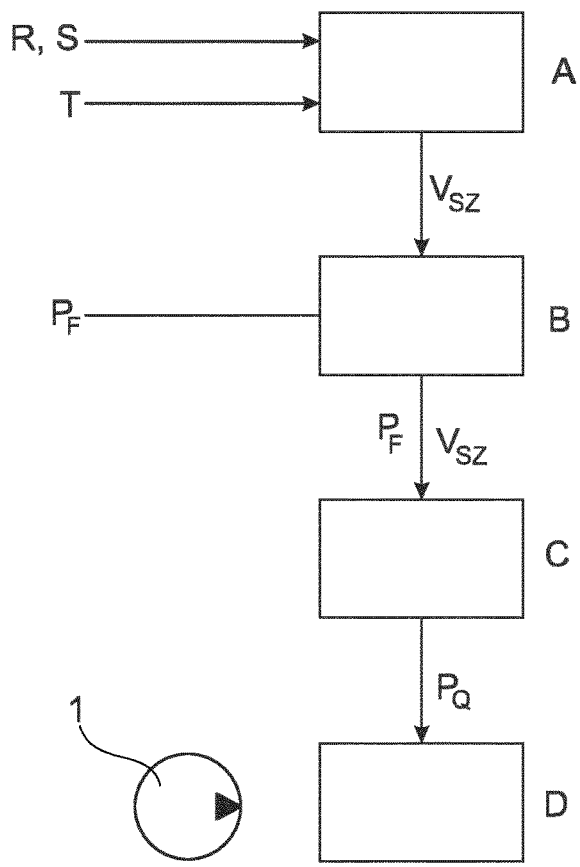
Fig. 4

COMPUTER-AIDED METHOD AND DEVICE FOR OPTIMIZED CONTROL OF THE DELIVERY RATE OF A CONCRETE PUMP OR THE LIKE

REFERENCE TO RELATED APPLICATIONS

This application claims priority to German Patent Application No. 10 2019 108 781.3, filed Apr. 3, 2019, which is incorporated herein by reference in its entirety.

The present invention relates to a method for controlling the delivery rate of a concrete pump or the like for filling a formwork arrangement with a pumpable filling compound, in particular in-situ concrete, as a function of curing-relevant material and environmental parameters, after which the installed filling compound sets within the formwork arrangement.

Furthermore, the invention also relates to an electronic device performing such a method, which is preferably controlled by a computer program.

BACKGROUND OF THE INVENTION

The field of application of the invention extends primarily to construction engineering. For the construction of buildings, formwork arrangements of various shapes and dimensions usually occur, which are used, for example, as wall formwork, column formwork, stairway formwork, joist formwork and the like. In principle, such formworks form a mold into which a liquid filling compound, preferably an in-situ concrete, is introduced for the production of building components. After setting, i.e. hardening, of the filling compound, the formwork is usually removed and reused. The filling of the mold space created by a formwork arrangement with preferably in-situ concrete is usually carried out on the construction site by means of a concrete pump, which is usually part of a mixer vehicle. Within the scope of the present invention, however, stationary concrete pumps can also be controlled with respect to their delivery rate using the solution according to the invention. Apart from concrete pumps, other media pumps are also suitable for this purpose, with which a pumpable filling compound is conveyed for the purpose of the invention. For example, a plaster compound, a LK:

synthetic resin compound or combinations thereof can also be considered as a pumpable filling compound.

STATE OF THE ART

DE 10 2008 017 123 A1 describes a generic method for controlling the delivery rate of a concrete pump, which in this case is designed as a mixer pump for in-situ concrete. The in-situ concrete is mixed in a mixer drum of a vehicle and fed via a buffer tank to a motor-driven concrete pump, which then conveys it via a delivery line to the concreting point, i.e. to the area of the mold space of the formwork arrangement. The concrete pump drive is switched on and off by the driver of the vehicle via a remote control unit. The filling level in a buffer container at the mixer drum, on the other hand, is automatically monitored and the quantity of in-situ concrete added to the buffer container is controlled in accordance with the filling level and as a function of the drive state of the concrete pump. This primarily achieves a uniformity of the material flow, although the concrete supply for filling the formwork arrangement is switched on and off manually as required.

During this manual activity, the driver or operator of the concrete pump must ensure that the formwork arrangement is not filled too quickly in order to avoid overloading the formwork arrangement. Filling a formwork arrangement too quickly can cause damage to the formwork elements and even cause the formwork arrangement to burst. In extreme cases, this safety risk can even be the cause of fatal accidents. In addition, filling a formwork arrangement too quickly can lead to deformation of the same and thus to convex component surfaces, which require costly reworking, if not even demolition. On the other hand, if the formwork arrangement is filled too slowly due to a manually selected delivery rate of the concrete pump that is analogously too low, the resulting delay is cumulatively prolonged. This is because concreting work is usually carried out in successive working steps, whereby, for example, climbing formwork for building a wall structure is moved and filled from working step to working step. This cumulative effect can lead to a significant extension of the construction time.

Manual control of the correct delivery rate of a concrete pump thus depends heavily on the experience of the driver or operator. Nevertheless, other influencing factors, such as temperature or formulation-related fluctuation ranges in the curing process of the concrete, can lead to unpredictable quality fluctuations.

It is therefore the object of the present invention to provide a method and a device for controlling the delivery rate of a concrete pump or the like for filling a formwork arrangement, which ensures an optimum filling speed of the formwork arrangement by matching it with the relevant material and environmental parameters.

DISCLOSURE OF THE INVENTION

The object is solved by claim 1 on the basis of a generic method for controlling the delivery rate of a concrete pump for filling a formwork arrangement. With respect to a device carrying out the method, reference is made to claim 7. Claim 14 reproduces a computer program embodying the method according to the invention, which can be deposited in a retrievable manner on a machine-readable data carrier or a cloud memory according to claim 15.

The invention includes procedural teaching involving the sequence of the following steps:

- determining a permissible rate of ascent (ascending or rising speed) for filling the formwork arrangement with the filling compound, preferably in-situ concrete, on the basis of material and ambient parameters,
- measuring the static filling compound pressure acting on the formwork assembly during filling,
- calculating the permissible delivery rate of the concrete pump as a function of the determined permissible rate of ascent and the measured static filling compound pressure at the formwork arrangement.

The optimum delivery rate calculated in this way is then used as a control signal for the concrete pump or the like, in that the control signal is preferably specified to an electronic pump control unit of the concrete pump or the like. This can be done, for example, as part of a closed-loop control in the form of a setpoint specification.

The invention is based on the knowledge that the permissible rate of rise of the filler within the formwork arrangement, on which the filler pressure exerted on it and the pressure distribution occurring along the height of the formwork depend, is mainly influenced by the filler formulation, for example the individual concrete formulation and the fresh concrete resulting from it, and the outside temperature prevailing at the construction site when the filler is placed, as essential material or environmental parameters. The corresponding filler mix formulation data can be taken from the construction planning information, for example from the execution planning documents in which the construction materials to be used are specified. From the geometric dimensional data of the structure to be built, which are also available, and the construction planning information derived from this with regard to the formwork, concerning the type and dimensions of the formwork and the like, relevant environmental parameters, such as filling height, component shape and the like, can also be determined. Thus, the use of a relatively weak formwork arrangement leads to correspondingly lower permissible climbing speeds for the filling so as not to overload the formwork arrangement. A relatively stronger formwork arrangement, on the other hand, can cope with a correspondingly higher climbing speed for filling the same. The relevant environmental parameters can be determined by testing or measurement.

In the case of the ambient parameter outside temperature, for example, a correspondingly fast setting of the in-situ concrete can be expected at relatively high outside temperatures, so that under these conditions a correspondingly high rate of rise can be run for filling the formwork arrangement. The correlations in this respect can also preferably be determined by tests or measurements. Other parameters can also play a role, such as the wall thickness to be concreted, the type of reinforcement to be cast around, the formwork height determining the filling height and the like.

Preferably, the outside temperature is measured via a temperature sensor on site, in particular in the area of the mixer vehicle or the formwork arrangement. For example, the temperature sensor can be mounted in the filling space of the formwork arrangement, on the outside of the formwork arrangement or in its vicinity. Local construction site measurement is also possible, for example as part of a construction site weather station. In addition, however, it is also conceivable that information regarding the prevailing outside temperature is taken from a publicly accessible local weather database, so that a separate temperature sensor and the signal transmission technology required for this can be omitted.

The measurement of the static filling compound pressure acting on the formwork arrangement during filling, as provided for in the invention, can be carried out in various ways. The static filling compound pressure is understood to be the pressure exerted on the formwork wall by the essentially stationary filled mass. This is preferably measured by a measuring sensor arranged in the area of the formwork arrangement.

According to a first embodiment, the measuring sensor system arranged in the area of the formwork arrangement for measuring the static filling compound pressure can be designed as a measuring bracket overlapping opposite formwork parts with an integrated pressure or tension measuring sensor. This overlapping measuring arrangement makes it possible to determine the outwardly directed filling pressure in a simple manner. The measuring bracket should be positioned at a point of the formwork arrangement where the highest filling pressure is to be expected. As a rule, the lower part of the formwork has a higher filling pressure than the upper part because of the known pressure distribution relationships. Bracing or stiffening of the formwork panels must not impair the deformation-related measuring effect. The measuring bracket should also be adjustable in length to encompass differently spaced formwork parts.

According to a second embodiment, it is proposed that the measuring sensor system arranged in the area of the formwork arrangement for measuring the static filling compound pressure is designed as a strain gauge arrangement applied to at least one outer surface of the formwork. The strain gauge arrangement can be used to determine the component stress caused by the filling compound pressure in the formwork arrangement, which can be converted into the desired pressure value via the physical relationships known per se.

According to an alternative embodiment, the measuring sensor system arranged in the area of the formwork arrangement can also be designed as a pressure cell or the like, which is inserted into an opening in a formwork panel. Commercially available pressure sensors made of metal have proved suitable for the purpose of the invention. They are usually provided with a glycerine filling for transmitting the measured value and record the measured value via an elastomer diaphragm on the end face. In addition, a so-called lost pressure sensor contained directly in the filling compound in the filling chamber can also be used as a measuring sensor. It is also conceivable to use a pressure-sensitive acoustic plate in which the pressure measurement function is integrated over the entire surface.

In addition to the control purposes of central interest here, the measurement data obtained can also be used in a central database for verification purposes to a customer/builder or for internal documentation purposes or as learning data for artificial neural networks. Likewise, a kind of live display on site for the purpose of manual control of the control system is conceivable, which can be done, for example, via a smartphone app by accessing the aforementioned central database.

From at least a subset of the material and ambient parameters discussed above, the quantity of filling mass, i.e. in particular concrete, to be pumped per unit of time is determined in accordance with the invention, which corresponds to the aforementioned permissible rate of rise, which in turn determines the permissible delivery rate of the concrete pump or the like. The static filling compound pressure or the filling compound pressure curve along the filling height of the formwork arrangement is used in particular to check whether the delivery rate can be increased as a result of a subthreshold filling mass pressure, or whether the delivery rate is to be reduced as a result of a suprathreshold filling mass pressure, or whether the concrete pump or the like is to be switched off temporarily. By interrupting the pump delivery accordingly, the filling compound is given sufficient time to reduce the filling compound pressure exerted on the formwork as a result of incipient curing processes. Depending on the application, other control parameters for the concrete pump, such as the flow rate of the fresh concrete or its distribution in the filling space of the formwork arrangement, can also be taken into account if necessary.

The control method according to the invention described above can be implemented with an electronic device which, according to a preferred embodiment, comprises a computer unit in which the functions of the analysis unit and the evaluation unit are implemented in software. The computer unit can be arranged locally on the construction site in the sense of a decentralized solution; Preferably, however, it is proposed that the computer unit or at least parts thereof be designed at a central location, for example in the form of a remote server with a corresponding database connection, which is connected via suitable communication links, for example radio data transmission, wireless LAN, Internet and the like, to local components, for example the pump control unit of the concrete pump or the like, for the control purposes and receives the measurement signals determined by the measurement sensors on the formwork arrangement for the purpose discussed above via as far as possible the same communication channel. Other centralized, decentralized or shared system configurations are also conceivable.

DETAIL DESCRIPTION OF THE DRAWING

Figure 5:
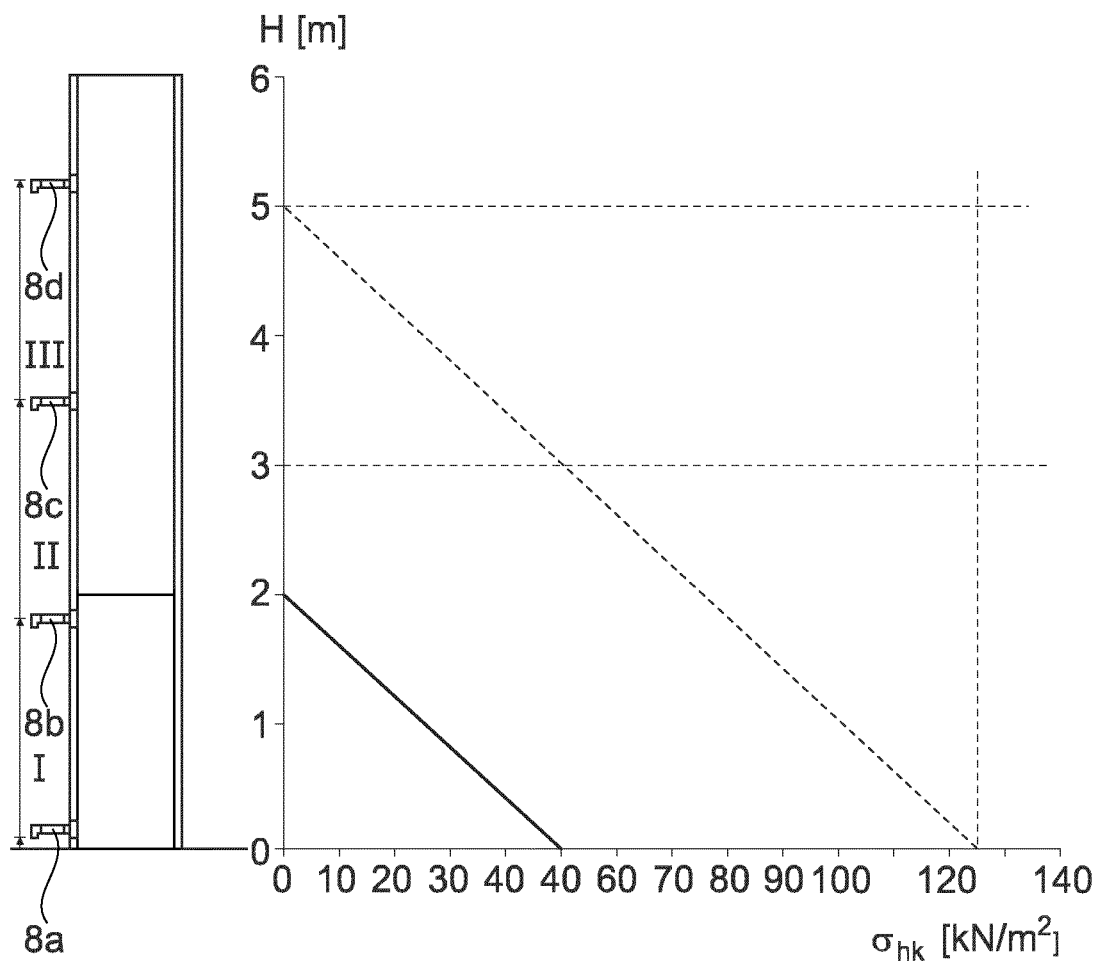

Further measures improving the invention are shown in more detail below together with the description of embodiments of the invention with reference to the figures. It shows:

FIG. 1 a schematic representation of a complete system for filling a formwork arrangement, in which a device according to the invention for controlling the delivery rate of a concrete pump is integrated, FIG. 2 schematic detailed representation of a first embodiment for a measuring sensor system for measuring the static filling compound pressure on the formwork arrangement, FIG. 3 schematic representation of a second embodiment for a measuring sensor system for measuring the static filling compound pressure at the formwork arrangement, FIG. 4 flow chart illustrating the sequence of the essential process steps according to the invention, which are carried out by the device contained in FIG. 1, and FIG. 5 pressure distribution diagram to illustrate the filling compound pressure along the formwork height.

According to FIG. 1, a concrete pump 1 of a concrete mixing vehicle—not shown further—is provided for filling a formwork arrangement 2 on a construction site—shown here only in part—with a pumpable filling compound 3, which in this embodiment is a suitable in-situ concrete.

The concrete pump 1 conveys the filling compound 3 from a buffer tank 4 of the concrete mixing vehicle via a locally positionable pipeline arrangement 5 into the filling area of the formwork arrangement 2. In this embodiment, the formwork arrangement 2 surrounds a wall section 6 that has already been built up to some extent in the course of a preceding concreting step, in order to fill the filling space 7 created by the formwork arrangement 2 with in-situ concrete in the following concreting step of the wall section 6 in accordance with an existing construction plan.

In this embodiment, the highly simplified formwork arrangement 2 consists of two formwork sections 2a and 2b arranged opposite each other, which are realized from formwork segments of a conventional modular system that are known per se.

A measuring sensor 8 is arranged on the formwork arrangement 2, specifically on the formwork part 2b, opposite the filling space 7 for measuring the static filling compound pressure $p_F$ acting on the formwork arrangement 2 during filling with the filling compound 3. As a result of increasing filling of the formwork arrangement 2 with the filling compound 3 to be cured, the load acting on the formwork arrangement 2 from the filling chamber 7 increases, which is expressed in corresponding component stresses as a result of the outwardly directed forces. In this example, the filling compound pressure $p_F$, which is seen in analogy to this, is passed on as an input value to an electronic evaluation unit 13 via a wireless communication link.

An associated analysis unit 10 is used to determine a permissible climbing speed vsz for filling the formwork arrangement 2 with the filling compound 3 on the basis of relevant material and ambient parameters. For this purpose, the analysis unit 10 receives various input values which comprise control-relevant material and environment parameters RST. The filling compound formulation data R form a material parameter which provides formulation information about the filling compound 3 used in the form of a single value or a data record, since, for example, depending on the concrete formulation, there is a material-specific curing characteristic which also determines the permissible rate of rise vsz during the filling process. Such filling compound formulation data R are provided by a construction planning database 11 containing this construction planning information. The planning database 11 contains all the necessary information of the construction planning about the structure to be built and thus also the prescribed material specifications with regard to the filling compound composition, which are specified for the construction of the wall section 6 to be built.

In addition, the planning database 11 also contains information regarding formwork dimension data S, from which, in particular, the section-by-section concreting height, the section-by-section concreting area, the wall thickness of a concreting section and the like can be derived in order to also take into account these geometric environmental parameters required for determining the permissible rate of ascent vsz.

Another relevant environmental parameter to be taken into account is the outside temperature prevailing on the construction site during the concreting process, because this influences the setting process and thus the permissible rate of rise vsz of the filling compound 3 to be poured. In this embodiment example, the environmental parameter regarding the outside temperature T is supplied starting from a correspondingly updated publicly accessible weather database 12.

Based on all these material and ambient parameters RST influencing the permissible rising speed vsz, the analysis unit 10 determines the permissible rising speed vsz for filling the formwork arrangement 2 with the filling compound 3 and passes this value on to the evaluation unit 13 for calculating a permissible delivery line $P_Q$ of the concrete pump 1 matched to it. The evaluation unit 13 also takes into account the static filling compound pressure $p_F$ at the formwork arrangement 2 measured by the measuring sensor 8 for control purposes. This means that the evaluation unit 13 requests a reduction of the delivery line $P_Q$ if the filling compound pressure $p_F$ exceeds an upper limit value. In an analogous manner, the delivery line $P_Q$ is increased if the filling compound pressure $p_F$ falls below a permissible limit value. However, this control, which is primarily for monitoring purposes, is superimposed on the primary control of the concrete pump 1 with regard to its delivery line $P_Q$ via the permissible rate of rise vsz determined on the basis of the material and ambient parameters RST. The permissible rate of rise vsz results from the volume flow conveyed by the concrete pump in conjunction with the geometric dimensions of the filling chamber 7. Instead of the criterion of the rate of rise vsz, another parameter analogous to this can also be used in equivalence to the control purposes of the invention.

The permissible delivery line $P_Q$ calculated in this way is transmitted in this embodiment example via an at least partially wireless communication channel, here including the Internet 9 from a central location to the pump control unit 14 of the concrete pump 1 locally present on the construction site as a control signal. In contrast, in this embodiment example, the analysis unit 10 and the evaluation unit 13 are accommodated by software in a central computer unit 15, which thus represents a remote control server. This computer unit 15 has access to the planning database 11 integrated therein as well as the public weather database 12 and—also via at least partially wireless communication—via Internet 9 to the sensor signal of the measuring sensor system 8 on site at the construction site. This can of course alternatively also be routed via the connection channel of the pump control unit 14 as part of bidirectional data transmission.

FIG. 2 illustrates a first embodiment for the realization of a measuring sensor system 8 for measuring the static filling compound pressure $p_F$ discussed above. For this purpose, a measuring bracket 16 is used which overlaps opposing formwork parts 2*a* and 2*b* and at one end of which a pressure or tension measuring sensor 17 is integrated. The arrangement shown here is specifically a pressure sensor. If such a sensor is integrated in the middle section of the measuring bracket 16, it would specifically be a tension sensor in order to obtain analog measured values.

In the example illustrated in FIG. 3, the measuring sensor 8' used for the same purpose is a strain gauge arrangement 18 applied to the surface of a formwork part 2*b*, which measures the local component stresses in the formwork part 2*b* at a suitable point in order to draw conclusions from this about the static filling material pressure $p_F$ present.

According to FIG. 4, in summary, the control of the delivery line $P_Q$ for the concrete pump 1 is carried out in sequence of the steps listed below, which are preferably implemented by software in the form of a computer program with program code means for carrying out the steps.

First, a determination A of a permissible rate of ascent vsz for filling a formwork arrangement with a suitable filling compound is carried out on the basis of provided material and environmental parameters RST, which are taken here from various sources.

Parallel to the filling of the formwork arrangement with the filling compound, the static filling compound pressure $p_F$ acting on the formwork arrangement is measured B and made available as a measured value.

Subsequently, a calculation C is carried out with regard to a permissible delivery line $P_Q$ for the concrete pump 1, which is proportional to the delivered volume flow, depending on the determined permissible rate of ascent vsz or a characteristic value analogous thereto and the measured static filling compound pressure $p_F$ at the formwork arrangement for control purposes. In the final step, the calculated delivery line $P_Q$ or the analog value is transmitted D to the pump control of the concrete pump 1 in the form of a control signal.

FIG. 5 illustrates the distribution of the filling compound pressure along the formwork height H of 6 meters for a concreting height of 5 meters in the final state in three consecutive concreting steps I. to III. By filling the fresh concrete into the filling space of the formwork arrangement, a static surface pressure $\delta_{hk}$ is generated on the formwork arrangement. When the hardening of the filling mass starts from the bottom, this filling compound pressure decreases in relation to this. Once the filler has hardened sufficiently, the next concreting step can be carried out on this basis. The three concreting steps I. to III. result from the maximum load capacity of the formwork arrangement of up to 50 kN/m² per concreting step, which results in a maximum filling height of approx. 1.8 meters per concreting step, indicated by the triangular marking. The filling pressure is monitored here by a total of four pressure measuring cells forming the measuring sensors 8*a* to 8*d*, which are arranged along the filling height on the formwork arrangement.

The invention is not limited to the preferred embodiment described above together with variations thereof. Rather, other variants are also conceivable, which are also covered by the scope of protection of the following claims. For example, it is also conceivable to arrange the computing unit for determining the control signal of the concrete pump locally in a concrete mixer vehicle or stationary on the construction site, with the required construction planning information and other material and environmental parameters being made available by remote data transmission, for example via a mobile radio channel. Furthermore, other material and environmental parameters can also be used for the control purposes of the invention, provided that they have an influence on the setting process of the filling compound.

LIST OF REFERENCE SIGNS

1 concrete pump
2 shuttering arrangement
3 filling compound
4 buffer tank
pipeline arrangement
6 wall section
7 filling room
8 measurement sensors
9 internet
analysis unit
11 planning database
12 weather database
13 evaluation unit
14 pump control unit
computer unit
16 measuring yoke
17 pressure or tension measuring sensor
18 tension gauge arrangement
A determination step
B measurement step
C calculation step
D transmission step
$P_Q$ delivery rate
$p_F$ fill compound pressure
vsz permissible rate of ascend
RST material and environmental parameters
R filling compound recipe data
S formwork dimension data
T ambient temperature
H formwork height
$\delta_{hk}$ static surface pressure
I.-III. concreting steps

The invention claimed is:

1. A method for controlling the delivery rate of a concrete pump for filling a formwork arrangement with a pumpable filling compound as a function of curing-relevant material and environmental parameters, afterwhich the installed filling compound sets within the formwork arrangement comprising:
   determining a permissible rate of ascent for filling the formwork arrangement with the filling compound on the basis of the material and ambient parameters,
   measuring the static filling compound pressure acting on the formwork arrangement during filling,
   calculating the permissible delivery rate of the concrete pump as a function of the determined permissible rate of ascent and the measured static filling compound pressure at the formwork arrangement.

2. The method according to claim 1, wherein the material and environment parameters are selected from a parameter group comprising: filling compound formulation data, formwork dimension data, or outside temperature.

3. The method according to claim 2, wherein the filling compound formulation is provided on the basis of available construction planning information of a construction planning database.

4. The method according to claim 3, wherein a material-specific temporal curing characteristic is or can be derived from the filling compound formulation data.

5. The method according to claim 2, wherein the information resulting from the formwork dimension data is provided on the basis of available construction planning information from the construction planning database.

6. The method according to claim 5, wherein the information includes a section-by-section concreting height, concreting area, and wall thickness.

7. The method according to claim 2, wherein the outdoor temperature is measured via a temperature sensor at a construction site or is provided by a public weather database.

8. The method according to claim 1, wherein the measurement of the static filling compound pressure acting on the formwork arrangement during filling is carried out by a measuring sensor system arranged in the region of the formwork arrangement.

9. A device for carrying out the method according to claim 1, comprising:
- an analysis unit for determining a permissible rate of ascent for filling the formwork arrangement with the filling compound on the basis of the material and ambient parameters,
- a measuring sensor system for measuring the static filling compound pressure acting on the formwork arrangement during filling,
- an evaluation unit for calculating the permissible delivery rate of the concrete pump as a function of the permissible rate of ascent determined by the analysis unit and the static filling compound pressure at the formwork arrangement measured by the measuring sensor system.

10. The device according to claim 9, wherein the measuring sensor system arranged in the region of the formwork arrangement for measuring the static filling compound pressure is configured as a measuring bracket with an integrated pressure or tension measuring sensor overlapping opposite outer formwork surfaces.

11. The device according to claim 9, wherein the measuring sensor system arranged in the region of the formwork arrangement for measuring the static filling compound pressure is configured as a strain gauge arrangement applied to at least one formwork part or as an inserted pressure sensor.

12. The device according to claim 9, wherein the analysis unit is connected to a central contruction planning database which contains data records with the required contruction planning information from which the filling compound formulation data and/or the formwork dimension data are derived.

13. The device according to claim 9, wherein the measuring sensor system arranged on the shuttering arrangement is at least partially wirelessly connected to a computer unit for transmitting the measuring signals, in which computer unit the analysis unit with connected construction planning database and/or the evaluation unit are integrated.

14. The device according to claim 9, wherein the pumpable filling compound is an in-situ concrete.

15. The device according to claim 9, wherein it is connected to a pump control unit for transmitting the calculated pump output for the purpose of correspondingly controlling the concrete pump.

16. A non-transitory machine readable medium storing a computer program with program code means for carrying out the steps according to claim 1, if the computer program is executed on an analysis unit and evaluation unit or a computer unit of a device.

* * * * *